United States Patent
Lee et al.

(10) Patent No.: US 11,844,018 B2
(45) Date of Patent: *Dec. 12, 2023

(54) METHOD AND APPARATUS FOR PROVIDING SERVICE IN WIRELESS COMMUNICATION SYSTEM

(71) Applicant: Samsung Electronics Co., Ltd., Suwon-si (KR)

(72) Inventors: Hoyeon Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,708

(22) Filed: Feb. 9, 2023

(65) Prior Publication Data

US 2023/0199634 A1    Jun. 22, 2023

Related U.S. Application Data

(63) Continuation of application No. 17/556,343, filed on Dec. 20, 2021, now Pat. No. 11,582,688, which is a
(Continued)

(30) Foreign Application Priority Data

Jun. 14, 2019    (KR) .......................... 10-2019-0071053

(51) Int. Cl.
*H04W 48/18*    (2009.01)
*H04L 69/327*    (2022.01)
(Continued)

(52) U.S. Cl.
CPC ........... *H04W 48/18* (2013.01); *H04L 69/327* (2013.01); *H04W 8/08* (2013.01); *H04W 60/04* (2013.01)

(58) Field of Classification Search
CPC ....... H04W 48/18; H04W 8/08; H04W 60/04; H04L 69/327
(Continued)

(56) References Cited

U.S. PATENT DOCUMENTS

2019/0053308 A1* 2/2019 Castellanos Zamora ................... H04L 65/1016
2019/0335392 A1* 10/2019 Qiao ...................... H04W 48/16
2019/0364541 A1* 11/2019 Ryu ....................... H04W 80/10

FOREIGN PATENT DOCUMENTS

WO    2018/008980 A1    1/2018

OTHER PUBLICATIONS

3GPP TSG-SA WG2 Mtg #133 S2-1906169 May (Year: 2019).*
(Continued)

*Primary Examiner* — William Nealon
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for replacement of a DNN and/or S-NSSAI in a wireless communication system is provided.

20 Claims, 11 Drawing Sheets

Related U.S. Application Data continuation of application No. 16/900,128, filed on Jun. 12, 2020, now Pat. No. 11,206,611.

(51) Int. Cl.
 *H04W 8/08* (2009.01)
 *H04W 60/04* (2009.01)
(58) Field of Classification Search
 USPC .......................................................... 370/329
 See application file for complete search history.

(56) References Cited

OTHER PUBLICATIONS

3GPP TS23.501 V16.1.0 June (Year: 2019).*
3GPP TS23.502 V16.1.0 June (Year: 2019).*
3GPP TS23.503 V16.1.0 June (Year: 2019).*
Ericsson et al., DNN replacement, S2-1906169, 3GPP TSG-SA WG2 Meeting #133, Reno, Nevada, USA, May 17, 2019, pp. 3-6.
Ericsson et al., DNN replacement in 5GC, S2-1905044, 3GPP TSG-SA WG2 Meeting #133, Reno, Nevada, USA, May 7, 2019, pp. 1-2.
LG Electronics, Clarification related to Subscription data type, S2-181527, 3GPP TSG-SA WG2 Meeting #126, Montreal, Canada, Feb. 13, 2018, pp. 9-11 and figure 4.2.2.2.3-1.
Nokia et al., CN handling of unsupported Dnn, S2-1902114, 3GPP TSG-SA WG2 Meeting #131, Santa Cruz, Tenerife, Spain, Feb. 19, 2019, pp. 1-2.
International Search Report dated Sep. 9, 2020, issued in International Patent Application No. PCT/KR2020/007669.
3GPP TS 23.501 V16.1.0, clause 5.15.5.3 and clause 5.15.5.2.2, 3rd Generation Partnership Project; Technical Specification Group Services and System Aspects; System Architecture for the 5G System; Stage 2 (Release 16), Jun. 11, 2019.
3GPP TS 23.503 V16.1.0, clause 6.6.2 and clause 6.1.2.2.1, 3rd Generation Partnership Project; Technical Specification Group Services and System Aspects; Policy and Charging Control Framework for the 5G System; Stage 2 (Release 16), Jun. 11, 2019.
3GPP TSG-SA WG2 Mtg #133 S2-1906117 May (Year: 2019).
Extended European Search Report dated Jun. 14, 2022, issued in a counterpart European Application No. 20822423.8.
Nokia, Nokia Shanghai Bell; 5GC handling of unsupported DNN; 3GPP TSG-SA WG2 Meeting #131; S2-1902115; Feb. 19, 2019, Santa Cruz, Tenerife, Spain.
Nokia, Nokia Shanghai Bell; 5GC handling of unsupported DNN requested by a UE; 3GPP TSG-SA WG2 Meeting #131; S2-1902116; Feb. 19, 2019, Santa Cruz, Tenerife, Spain.
Ericsson, Nokia, Nokia Shanghai Bell; DNN replacement in 5GC; 3GPP TSG-SA WG2 Meeting #133; S2-1906167; May 29, 2019, Reno, Nevada, USA.

* cited by examiner

METHOD AND APPARATUS FOR PROVIDING SERVICE IN WIRELESS COMMUNICATION SYSTEM

CROSS-REFERENCE TO RELATED APPLICATION(S)

This application is a continuation application of prior application Ser. No. 17/556,343 filed on Dec. 20, 2021, which will be issued as U.S. Pat. No. 11,582,688 on Feb. 14, 2023; which is a continuation application of prior application Ser. No. 16/900,128 filed on Jun. 12, 2020, which has issued as U.S. Pat. No. 11,206,611 on Dec. 21, 2021; and which is based on and claims priority under 35 U.S.C. § 119(a) of a Korean patent application number 10-2019-0071053, filed on Jun. 14, 2019, in the Korean Intellectual Property Office, the disclosure of which is incorporated by reference herein in its entirety.

BACKGROUND

1. Field

The disclosure relates to a method and apparatus for providing a service requested by a terminal in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a solution for processing a case where parameters (for example, a data network name (DNN), single network slice selection assistance information (S-NSSAI), and the like), transmitted to a network function (NF) by a user equipment (UE), are not valid, or a case where the parameters cannot be provided by a mobile communication system (for example, a $5^{th}$ generation system (5GS), an evolved packet system (EPS), and the like).

Additional aspects will be set forth in part in the description which follows and, in part, will be apparent from the description, or may be learned by practice of the presented embodiments.

According to an embodiment of the disclosure, the case where the parameters transmitted to the NF by the UE are not valid may include the case where UE configuration information (for example, UE route selection policy (URSP), local configuration, and the like) stored by the UE is not the latest information, the case where there is no UE configuration information, or the like.

According to an embodiment of the disclosure, the case where parameters, transmitted to the NF by the UE, cannot be provided by a mobile communication system may include the case where the parameters cannot be provided due to an operator policy, the case where the parameters cannot be provided at the current location of the UE, the case where the parameters cannot be provided due to a temporary failure in the mobile communication system, or the case where the parameters cannot be provided due to a roaming contract.

In accordance with an aspect of the disclosure, a method performed by an access and mobility management function (AMF) in a mobile communication system is provided. The method includes selecting a policy control function (PCF) for a replacement of DNN, based on a received registration request message from a user equipment (UE), transmitting, to the PCF, allowed network slice selection assistance information (NSSAI) for the UE, receiving, from the PCF, first list information on the replacement of DNN, based on the allowed NSSAI, receiving, from the UE, a protocol data unit (PDU) session establishment request message including single NSSAI (S-NSSAI) for a PDU session and a UE requested DNN, and determining to perform a replacement of the UE requested DNN, based on the first list information.

In accordance with another aspect of the disclosure, a method performed by a policy control function (PCF) in mobile a communication system is provided. The method includes transmitting, to a network repository function (NRF), a network function (NF) register request message including capability information of the PCF to indicate whether or not the PCF supports a replacement of DNN, receiving, from the NRF, an NF register request response message for an acknowledgement that an NF register request is accepted, receiving, from an access and mobility management function (AMF), allowed network slice selection assistance information (NSSAI) for a user equipment (UE), and transmitting, to the AMF, first list information on the replacement of DNN, based on the allowed NSSAI, wherein a protocol data unit (PDU) session establishment request message including single NSSAI (S-NSSAI) for the PDU session and a UE requested DNN is transmitted to the AMF from the UE and a replacement of the UE requested DNN is performed based on the first list information.

In accordance with another aspect of the disclosure, a method performed by a network repository function (NRF) in a mobile communication system is provided. The method includes receiving, from a policy control function (PCF), a network function (NF) register request message including capability information of the PCF to indicate whether or not the PCF supports a replacement of DNN, transmitting, to the PCF, an NF register request response message for an acknowledgement that an NF register request is accepted, receiving, from an access and mobility management function (AMF), an NF discovery request message including capability information to indicate that the PCF supporting a capability for the replacement of DNN is preferred, and transmitting, to the AMF, an NF discovery response message including capability information to indicate whether or not the PCF supports the replacement of DNN.

In accordance with another aspect of the disclosure, an access and mobility management function (AMF) in a mobile communication system is provided. The AMF includes a transceiver, and at least one processor configured to select a policy control function (PCF) for a replacement of DNN, based on a received registration request message from a user equipment (UE), control the transceiver to transmit, to the PCF, allowed network slice selection assistance information (NSSAI) for the UE, control the transceiver to receive, from the PCF, first list information on the replacement of DNN, based on the allowed NSSAI, control the transceiver to receive, from the UE, a protocol data unit (PDU) session establishment request message including single NSSAI (S-NSSAI) for a PDU session and a UE requested DNN, and determine to perform a replacement of the UE requested DNN, based on the first list information.

In accordance with another aspect of the disclosure, a policy control function (PCF) in mobile a communication system is provided. The PCF includes a transceiver, and at least one processor configured to control the transceiver to transmit, to a network repository function (NRF), a network function (NF) register request message including capability information of the PCF to indicate whether or not the PCF supports a replacement of DNN, control the transceiver to receive, from the NRF, an NF register request response message for an acknowledgement that an NF register request is accepted, control the transceiver to receive, from an access and mobility management function (AMF), allowed network slice selection assistance information (NSSAI) for a user equipment (UE), and control the transceiver to transmit, to the AMF, first list information on the replacement of DNN, based on the allowed NSSAI, wherein a protocol data unit (PDU) session establishment request message including single NSSAI (S-NSSAI) for the PDU session and a UE requested DNN is transmitted to the AMF from the UE and a replacement of the UE requested DNN is performed based on the first list information.

In accordance with another aspect of the disclosure, a network repository function (NRF) in a mobile communication system is provided. The NRF comprising a transceiver, and at least one processor configured to control the transceiver to receive, from a policy control function (PCF), a network function (NF) register request message including capability information of the PCF to indicate whether or not the PCF supports a replacement of DNN, control the transceiver to transmit, to the PCF, an NF register request response message for an acknowledgement that an NF register request is accepted, control the transceiver to receive, from an access and mobility management function (AMF), an NF discovery request message including capability information to indicate that the PCF supporting a capability for the replacement of DNN is preferred, and control the transceiver to transmit, to the AMF, an NF discovery response message including capability information to indicate whether or not the PCF supports the replacement of DNN.

According to an embodiment of the disclosure, in a case where parameters (for example, DNN, S-NSSAI, and the like) transmitted by a UE to an NF are not valid or in a case where a mobile communication system (for example, 5GS, EPS, and the like) cannot provide the parameters, it is possible to prevent a service failure or a decrease in customer service quality by replacing the parameters transmitted by the UE with available parameters, instead of rejecting (session releasing) a request from the UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
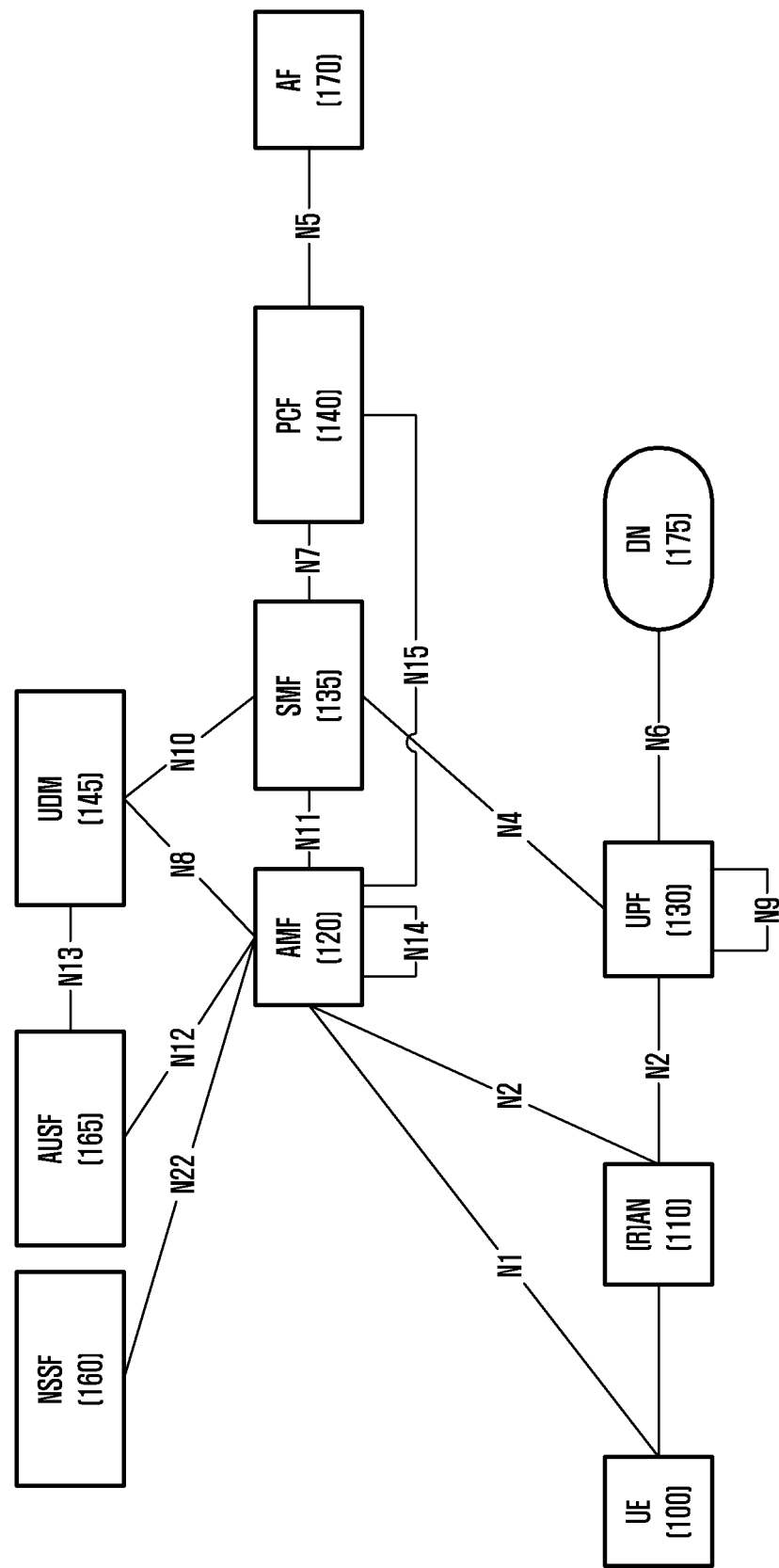
FIG. 1A illustrates a system structure of a $5^{th}$ generation system (5GS) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and methods for achieving the same will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same reference numerals designate the same elements.

Terms used to identify an access node used in the following description, terms referring to a network entity or network functions (NFs), terms referring to messages, terms referring to an interface between network entities, terms referring to various identification information, or the like are exemplified for convenience of explanation. Accordingly, the disclosure is not limited to the terms described below, and other terms indicating objects having equivalent technical meanings may be used.

For convenience of explanation below, the disclosure uses terms and names defined in 3rd generation partnership project long term evolution (3GPP LTE) and 5G standards. However, the disclosure is not limited by the terms and names, and can be applied to systems conforming to other standards.

Meanwhile, in the disclosure, the term "service" may be interchangeably used in order to refer to performing a request from another communication device (or NF) by a specific communication device (or NF) (i.e., referring to an NF Service), to refer to a service provided by a mobile communication operator (i.e., referring to a voice service, a text service, a data service, and the like), and to refer to a service provided by an over the top (OTT) operator (i.e., referring to a messenger service, a game service, and the like).

A mobile communication system provides UE access (attach)/registration and session connection (PDN connection, PDU session) in order to provide a service. To this end, a protocol between the UE and the NF of the mobile communication system has been defined, and the UE and the NF exchange various parameters defined by a control plane signaling protocol.

FIG. 1A illustrates a system structure of a 5GS according to an embodiment of the disclosure.

Referring to FIG. 1A, a 5G core network includes an access and mobility management function (AMF) 120, a session management function (SMF) 135, a user plane function (UPF) 130, a policy control function (PCF) 140, a unified data management (UDM) 145, a network slice selection function (NSSF) 160, an authentication server function (AUSF) 165, an application function (AF) 170, a data network (DN) 175, or the like. A UE 100 may access a 5G core network through a base station (RAN) 110. One or more NFs may interact with a network repository function (NRF) via Nnrf interfaces.

Figure 1B:
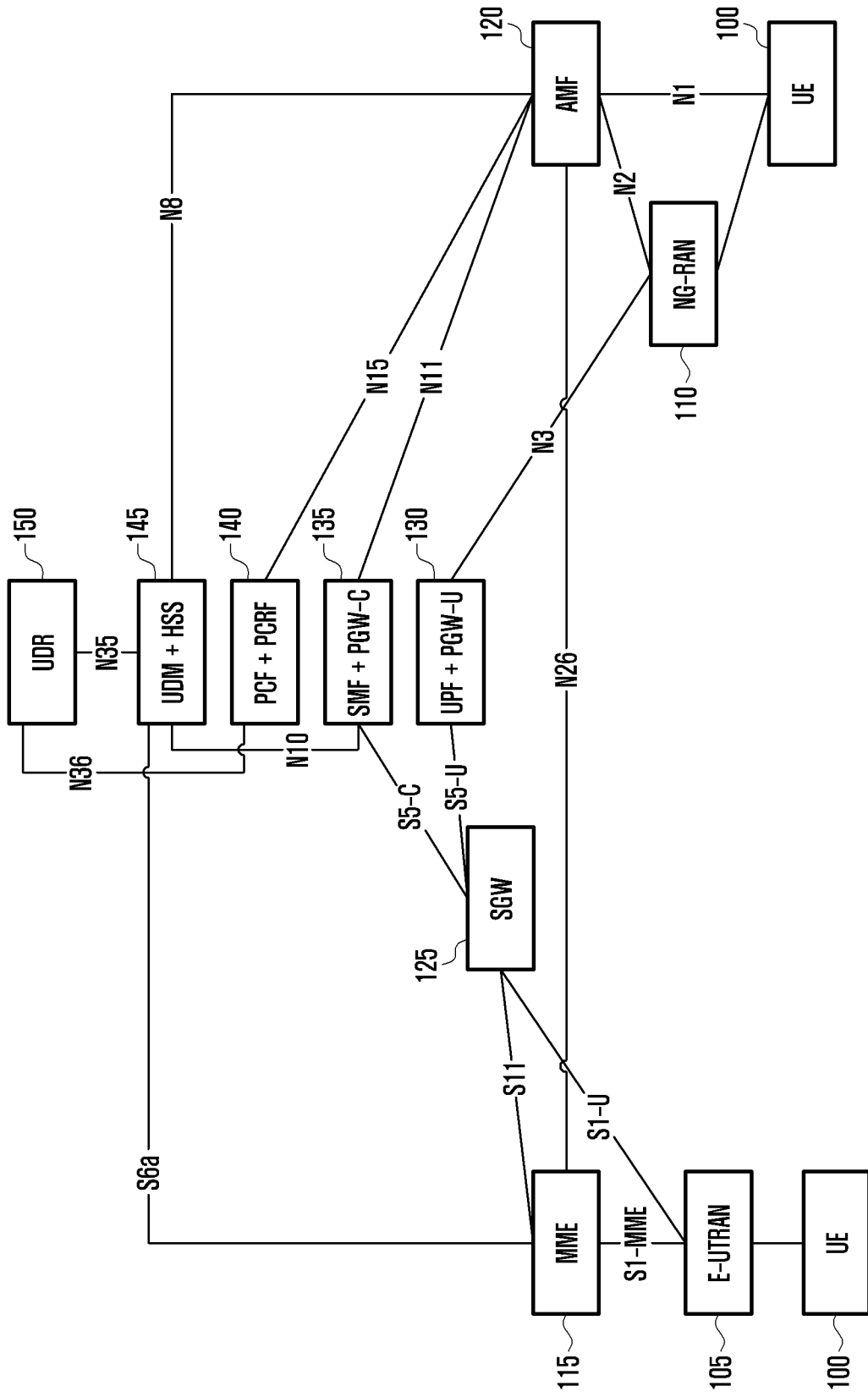
FIG. 1B illustrates an interworking structure of a 5GS and an evolved packet system (EPS) according to an embodiment of the disclosure.

FIG. 1B illustrates an interworking structure of a 5GS and an EPS according to an embodiment of the disclosure.

Referring to FIG. 1B, the 5GS may include a new radio (NR) base station (NG RAN) 110, an AMF 120, a SMF 135, a UPF 130, a PCF 140, and a UDM 145. The EPS may include an evolved universal terrestrial radio access (E-UTRA) base station 105, a mobility management entity (MME) 115, a serving gateway (SGW) 125, a PDN gateway (PGW)-U 130, a PGW-C 135, a policy and charging rules function (PCRF) 140, and a home subscriber server (HSS) 145. The UDM 145 of the 5GS and the HSS 145 of the EPS may be configured as one combo node (hereinafter, referred to as "UDM+HSS"). The SMF 135 of the 5GS and the PGW-C 135 of the EPS may be configured as one combo node (hereinafter, referred to as "SMF+PGW-C"). The UPF 130 of the 5GS and the PGW-U 130 of the EPS may be configured as one combo node (hereinafter, referred to as "UPF+PGW-U"). The UE 100 may access the MME 135 of the EPS through the E-UTRA base station 105 so as to use an EPS network service. Further, the UE 100 may access the AMF 120 of the 5GS through the NR base station 110 so as to use a 5GS network service.

The AMF 120 and MME 115 are network functions (NFs) that manage wireless network access and mobility for the UE. The SMF 135, PGWs 130 and 135, and the SMF+PGW-C 135 are NFs that manage a session for the UE, the session information may include quality of service (QoS) information, charging information, and information relating to packet processing. The UPF 130, the PGWs 130 and 135, and the UPF+PGW-U 130 are NFs that process user traffic (user plane traffic) and are subject to control by the SMF 135, the PGWs 130 and 135, the SMF+PGW-C 135. The PCF 140, the PCRF 140, and the PCF+PCRF 140 are NFs that manage operator policies for providing services in a wireless communication system. The UDM 145, the HSS 145, and the UDM+HSS 145 nodes are NFs that store and manage UE subscription information. A unified data repository (UDR) 150 is an NF that stores and manages data. The UDR may store UE subscription information and provide the UE subscription information to the UDM. In addition, the UDR may store operator policy information and provide the operator policy information to the PCF.

Embodiment 1

Embodiment 1 describes a method for configuring an NF, by which parameters transmitted by a UE can be replaced with available parameters.

Figure 2:
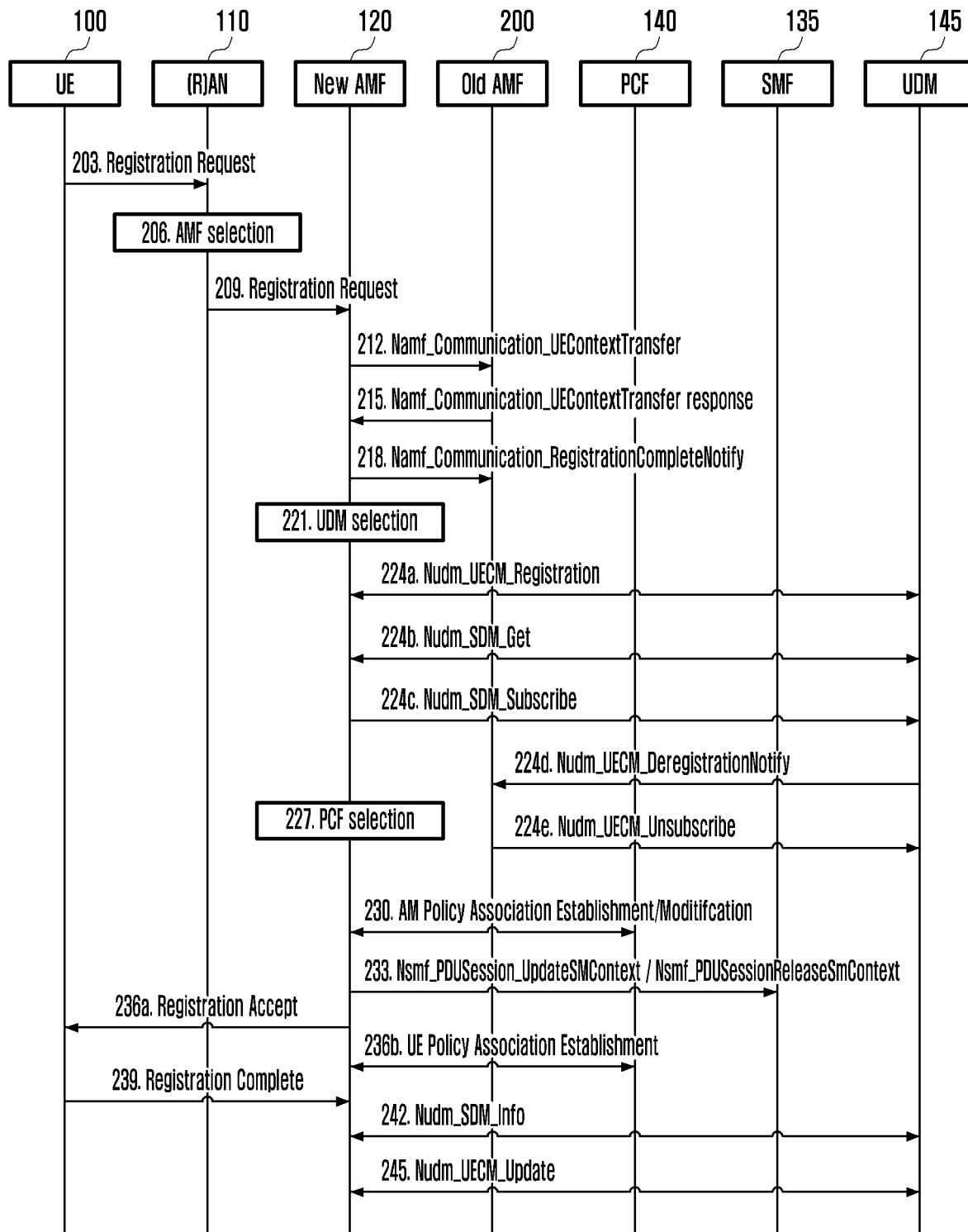
FIG. 2 illustrates a user equipment (UE) registration procedure according to an embodiment of the disclosure.

FIG. 2 illustrates a UE registration procedure according to an embodiment of the disclosure.

Referring to FIG. 2, in operation 203, a UE 100 may transmit a registration request message. The UE 100 may include, in the registration request message, capability information (e.g., DNN replacement, S-NSSAI replacement, DNN/S-NSSAI (both) replacement, and the like) of the UE 100. Further, the UE 100 may include, in the registration request message, slice information (e.g., Requested NSSAI, and the like) to be used by accessing a network by the UE 100. In operation 206, the base station 110, which has received the registration request message from the UE 100, may select an AMF to which the received message is to be transmitted, based on information (e.g., Requested NSSAI, UE 5G-globally unique temporary identifier (GUTI) or the like) received from the UE 100 in operation 203. In operation 209, the base station 110 may transmit the registration request message to the AMF (new AMF) 120 selected in operation 206. In the case of being capable of discovering an old AMF 200 based on the received UE 5G-GUTI information, the AMF 120 may perform operations 212, 215, and 218, and may acquire the context of the UE 100 from the old AMF 200. In operation 221, the AMF 120 may select the UDM 145. In operation 224a, the AMF 120 may perform registration, as an AMF serving the UE 100, in the UDM 145. In operation 224b, the AMF 120 may acquire, from the UDM 145, information related to the UE 100 (e.g., access and mobility subscription data, SMF selection subscription data, UE context, subscribed DNNs, subscribed S-NSSAIs, and the like). In operation 224c, the AMF 120 may register (subscribe) for an event related to the UE 100, provided by the UDM 145. Upon detecting that the AMF serving the UE 100 is changed from the old AMF 200 to the AMF 120, the UDM 145 may transmit a deregistration notification message to the old AMF 200 in operation 224d. In operation 224e, the old AMF 200 may cancel the event registration previously registered in the UDM 145. In operation 227, the AMF 120 may perform a PCF selection procedure. The PCF selection procedure will be described in operations 227a, 227b, and 227c of FIG. 3. In operation 230, the AMF 120 may establish an AM policy association with the PCF 140 selected in operation 227. The process of establishing the AM policy association between AMF 120 and the PCF 140 will be described in operations 230a, 230b, and 230c of FIG. 3. In operation 209, the AMF 120 may determine a network capability (e.g., DNN replacement, S-NSSAI replacement, DNN/S-NSSAI (both) replacement, and the like) to be provided to the UE 100, based on the information received from the UE 100 and/or the AM policy association established with the PCF 140 in operation 230. In operation 233, the AMF 120 may update or release a PDU session associated with the UE 100. In operation 236a, the AMF 120 may transmit a registration accept message to the UE 100. The AMF 120 may include slice information (e.g., Allowed NSSAI, and the like), which is available by accessing a network by the UE 100, in the registration accept message. In addition, the AMF 120 may include, in the registration accept message, network capability information (e.g., DNN replacement, S-NSSAI replacement, DNN/S-NSSAI (both) replacement) determined by the AMF 120. In operation 236b, the AMF 120 may establish UE policy association with the PCF 140 selected in operation 227. The process of establishing the UE policy association between the AMF 120 and the PCF 140 is described in operations 230a, 230b, and 230c of FIG. 3. In operation 239, the UE 100 may transmit a registration complete message to the AMF 120. In operation 242, the AMF 120 may perform a Nudm_SDM_Info procedure with the UDM 145. In operation 245, the AMF 120 may perform the Nudm_UECM_Update procedure with the UDM 145.

Figure 3:
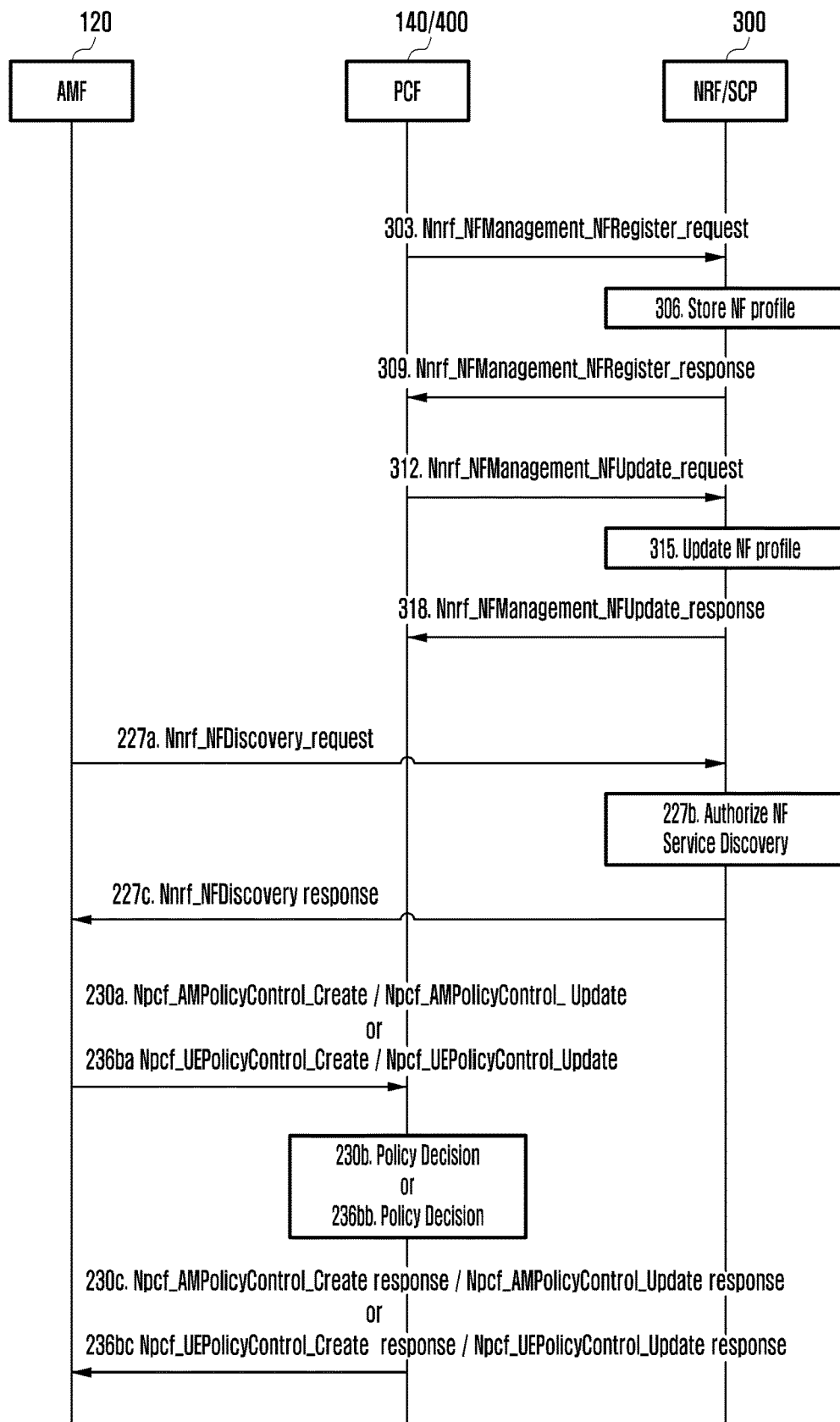
FIG. 3 illustrates a network function (NF) registration, discovery, and selection procedure according to an embodiment of the disclosure.

FIG. 3 illustrates an NF registration, discovery, and selection procedure according to an embodiment of the disclosure.

Referring to FIG. 3, in operation 303, the PCF 140 (or PCF 140/400) may transmit an Nnrf_NFManagement_NFRegister Request message in order to register an NF profile of the PCF 140 itself in a network repository function (NRF) 300. The Nnrf_NFManagement_NFRegister Request message may include an NF ID of the PCF 140, in which the NF ID refers to the PCF 140, and functions supportable by the PCF 140, that is, NF services (e.g., DNN replacement, S-NSSAI replacement, DNN/S-NSSAI (both) replacement, one or more DNNs supportable by the PCF 140, one or more S-NSSAIs supportable by the PCF 140, and the like). In operation 306, the NRF 300 may process the request from the PCF 120, received in operation 303, as follows. The NRF 300 may store the NF ID of the PCF 140 and the NF services supportable by the PCF 140. In operation 309, the NRF 300 may transmit an Nnrf_NFManagement_NFRegister response message to the PCF 140 and thus may provide notification that NF Service Registration has been completed.

After completing the NF registration in the NRF 300 through operations 303 to 309, the PCF 140 may perform operations 312 to 318 in order to update the NF service in the case where a change in the NF service supportable by the PCF 140 occurs. In operation 312, the PCF 140 may transmit an Nnrf_NFManagement_NFUpdate Request message to the NRF 300. The Nnrf_NFManagement_NFUpdate Request message may include the NF ID of the PCF 140, in which the NF ID refers to the PCF 140, and the NF service supportable by the PCF 140. In operation 315, the NRF 300 may discover NF profile information corresponding to the NF ID of the PCF 140, received in operation 312. The NRF 300 may update NF profile information of the PCF 140, stored in the NRF 300, with the NF service received in operation 312. In operation 318, the NRF 300 may transmit an Nnrf_NFManagement_NFUpdate response message to the PCF 140 and thus provide notification that the NF service update has been completed. For example, the PCF 140 may indicate that DNN replacement is possible, as the NF service of the PCF 140 in operation 303. Thereafter, the PCF 140 may indicate that DNN replacement is not possible, as the NF service of the PCF 140 in operation 312.

The NF (e.g., AMF, SMF, PCF, UPF, and the like) configuring a 5G system may register and update an NF profile provided by each NF in the NRF 300, as described in operations 303 to 309 and operations 312 to 318.

In addition, the NF registration, discovery, and update functions provided by the NRF shown in FIG. 3 may be similarly provided by a service communication proxy (SCP) 300.

As shown in FIG. 2, the AMF 120 according to an embodiment may select a PCF during the registration procedure of the UE 100 and establish a policy association with the selected PCF.

In operation 227, the AMF 120 may use an NF discovery service, which is provided by the NRF 300 for PCF selection.

In operation 227a, the AMF 120 may transmit an Nnrf_NFDiscovery request to the NRF 300. The Nnrf_NFDiscovery request, transmitted by the AMF 120, may include at least one of an NF type (for example, PCF) to be discovered by the AMF 120, and an NF support function (for example, DNN replacement, S-NSSAI replacement, DNN/S-NSSAI (both) replacement, and the like) to be discovered by the AMF 120, the current location of the UE 100 (e.g., cell ID, tracking area identity (TAI), and the like), the identifier of the UE 100 (e.g., a subscription permanent identifier (SUPI), 5G-GUTI, and the like), and the NF ID of the AMF 120. In operation 227b, the NRF 300 may process an NF discovery request, received in operation 227a, based on the NF profile information registered in the NRF 300. For example, in operation 227a, in the case where the AMF 120 requests discovering a PCF capable of performing DNN replacement for the UE 100, the NRF 300 may select one or more PCFs capable of performing DNN replacement among PCFs registered in the NRF 300. In addition, the NRF 300 may select one or more PCFs, close to the current location of the UE 100 and/or the location of the AMF 120, among one or more PCFs capable of performing DNN replacement. The Nnrf_NFDiscovery response message, which is transmitted by the NRF 300 to the AMF 120 in operation 227c, may include one or more pieces of PCF information selected by the NRF 300 (for example, the NF ID of the PCF, and NF services supported by the PCF (for example, DNN replacement, S-NSSAI replacement, DNN/S-NSSAI (both) replacement, one or more DNNs supportable by PCF 120, one or more S-NSSAIs supportable by PCF 120, and the like) and the like) The AMF 120 may select one PCF based on PCF information received from the NRF 300. For example, in the case where one piece of PCF information is received from the NRF 300, the AMF 120 may select a PCF, which is selected by the NRF 300 and notified to the AMF 120. Alternatively, in the case where multiple pieces of PCF information are received from the NRF 300, the AMF 120 may select a PCF based on the local configuration of the AMF 120, the location of the UE 100, and the location of the PCF and the like. Alternatively, the AMF 120 may select a PCF based on the local configuration stored in the AMF 120 without using an NF discovery function provided by the NRF 300, that is, without performing operation 227a to operation 227c.

In operation 230, the AMF 120 may establish an AM policy association with the selected PCF 140. In addition, in operation 236b, the AMF 120 may establish a UE policy association with the selected PCF 140.

In operations 230a to 236ba, Npcf_AMPolicyControl_Create to Npcf_UEPolicyControl_Create message, transmitted by the AMF 120 to the PCF 140, may include at least one of: the capability of the AMF 120 (for example, DNN replacement, S-NSSAI replacement, DNN/S-NSSAI (both) replacement, and the like), an indication requesting DNN replacement and/or S-NSSAI replacement; subscribed DNNs and/or subscribed S-NSSAIs of the UE 100, received by the AMF 120 from UDM 145 in operation 224b; the identifier of the UE 100 (e.g., SUPI, 5G-GUTI, and the like), a home public land mobile network (HPLMN) ID of the UE 100; and a location of the UE 100. In operations 230b to 236bb, the PCF 140 may determine policy information to be provided to the AMF 120, based on the information received from the AMF 120 in operations 230a to 236ba. For example, in the case where the AMF 120 requests DNN replacement, the PCF 140 may determine a DNN list configured by one or more DNNs for DNN replacement. The DNN list may include one or more pieces of S-NSSAI information that can be used together with respective DNNs configuring the DNN list. Alternatively, in the case where the AMF 120 requests S-NSSAI replacement, the PCF 140 may determine an S-NSSAI list (or may be referred to as an NSSAI list) configured by one or more S-NSSAIs for S-NSSAI replacement. The S-NSSAI list may include one or more pieces of DNN information that can be used together with respective S-NSSAIs configuring the S-NSSAI list. The DNN list and/or the S-NSSAI list may be configured differently according to the subscribed DNNs of the UE 100, the HPLMN of the UE 100, the location of the UE 100, and the like. In order to determine the HPLMN of the UE 100, the PCF 140 may use the HPLMN ID of the UE 100, received from the AMF 120, or the HPLMN ID of the UE 100, included in the identifier of the UE 100 (e.g., SUPI). The DNN list and/or S-NSSAI list may be configured by a blacklist and/or a whitelist. The Npcf_AMPolicyControl_Create response to Npcf_UEPolicyControl_Create response message, transmitted by the PCF 140 to the AMF 120 in operations 230c to 236bc, may include a DNN list and/or an S-NSSAI list, determined by the PCF 140. The AMF 120 may store the DNN list and/or the S-NSSAI list, received from the PCF 140, and may use the DNN list and/or the S-NSSAI list in subsequent operations and procedures of the AMF 120.

Embodiment 2

Embodiment 2 describes a method for replacing a parameter transmitted by a UE with an available parameter.

Figure 4:
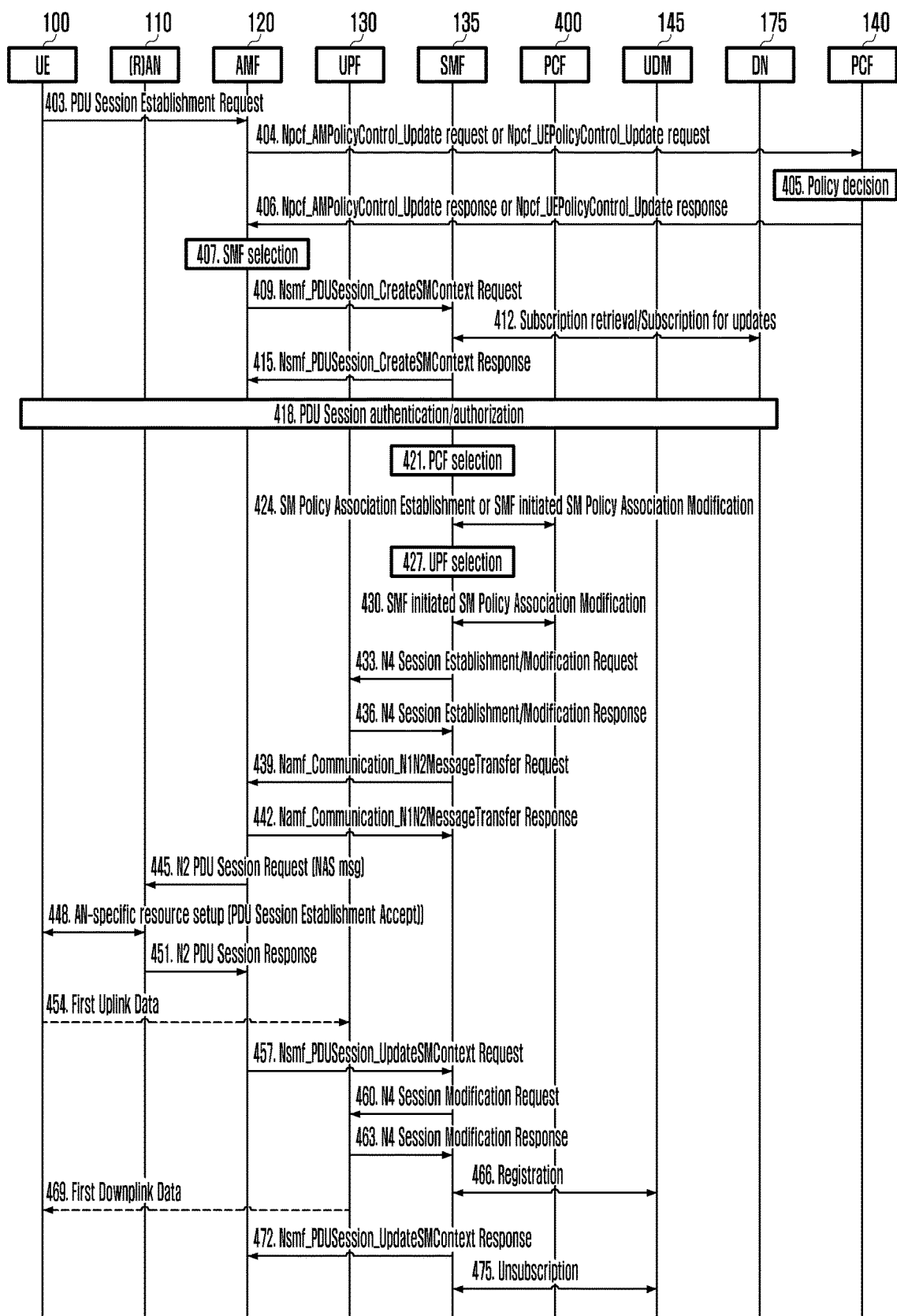
FIG. 4 illustrates a Protocol Data Unit (PDU) session establishment procedure according to an embodiment of the disclosure.

FIG. 4 illustrates a PDU session establishment procedure according to an embodiment of the disclosure.

Referring to FIG. 4, in operation 403, the UE 100 may transmit a PDU session establishment request message. The PDU session establishment request message may include a DNN and/or S-NSSAI, determined by the UE 100 based on local configuration information of the UE 100, and a PDU session ID assigned by the UE 100. The AMF 120 may determine whether to perform DNN replacement or S-NSSAI replacement based on at least one of local configuration, information (e.g., DNN list and/or S-NSSAI list) received from the PCF 140 in operations 230c to 236bc of FIG. 3, and UE requested DNN or a UE requested S-NSSAI information, received from UE 100 in operation 403.

For example, in the case where the DNN list and/or the S-NSSAI list, received from the PCF 140 through the procedure described in FIGS. 2 and 3, is a blacklist, and if the DNN or S-NSSAI included in the list is received from the UE 100 in operation 403, the AMF 120 may be aware that the DNN or S-NSSAI, received from the UE 100, are to be subject to DNN replacement or S-NSSAI replacement. Alternatively, if a DNN or S-NSSAI, which is not included in the list from the UE 100 in operation 403, is received from the UE 100 in operation 403, the AMF 120 may be aware that the DNN or S-NSSAI, received from the UE 100, are not to be subject to DNN replacement or S-NSSAI replacement.

According to another example, in the case where the DNN list and/or the S-NSSAI list received from the PCF 140 through the procedures described in FIGS. 2 and 3 is a whitelist, and if the DNN or S-NSSAI included in the list is received from the UE 100 in operation 403, the AMF 120 may be aware that the DNN or S-NSSAI, received from the UE 100, are not to be subject to DNN replacement or S-NSSAI replacement. Alternatively, if a DNN or S-NSSAI, which is not included in the list, is received from the UE 100 in operation 403, the AMF 120 may be aware that the DNN or S-NSSAI, received from the UE 100, are to be subject to DNN replacement or S-NSSAI replacement.

According to another example, if the AMF 120 determines that the DNN or S-NSSAI, received from the UE 100, are not to be subject to DNN replacement or S-NSSAI replacement and that the corresponding DNN or S-NSSAI cannot be supported, the AMF 120 may determine to reject the PDU session establishment request, requested by the UE, and may transmit an appropriate reject cause (e.g., DNN not supported, S-NSSAI not supported, and the like) to the UE 100 through operations 445 and 448.

The AMF 120 that has determined to perform DNN replacement and/or S-NSSAI replacement may perform operation 404. A message in operation 404 may include at least one of the requested DNN, the requested S-NSSAI, and the identifier of the UE 100 (for example, SUPI, 5G-GUTI, and the like), which are subject to replacement. In operation 405, the PCF 140 may make a policy determination.

For example, in the case where the AMF 120 requests DNN replacement for the requested DNN, the PCF 140 may determine a selected DNN to replace the received requested DNN (hereinafter, selected DNN or replaced DNN). In operation 406, the PCF 140 may transmit a reply message to the AMF 120. The reply message transmitted by the PCF 140 to the AMF 120 may include at least one of the selected DNN selected by the PCF 140, the requested DNN requested in operation 404, and S-NSSAI that can be used together with the selected DNN.

According to still another example, in the case where the AMF 120 requests S-NSSAI replacement for the requested S-NSSAI, the PCF 140 may determine the selected S-NSSAI to replace the received requested S-NSSAI. In operation 406, the PCF 140 may transmit a reply message to the AMF 120. The reply message transmitted by the PCF 140 to the AMF 120 may include at least one of the selected S-NSSAI selected by the PCF 140, the requested S-NSSAI requested in operation 404, and the DNNs that can be used together with the selected S-NSSAI.

In operation 406, the AMF 120 may store the information received from the PCF 140 as a UE context. For example, the AMF 120 may store at least one of: the PDU session ID, the requested DNN, and the requested S-NSSAI, which are received from the UE 100, and the selected DNN and the selected S-NSSAI, received from the PCF 140, as the UE context. In the case where the selected DNN and/or the selected S-NSSAI is received from the PCF 140, the AMF 120 may use the selected DNN and/or the selected S-NSSAI instead of the requested DNN and/or the requested S-NSSAI in subsequent operations.

If the AMF 120 according to an embodiment acquires the DNN list and/or the S-NSSAI list from the PCF 140 during the process of AM policy association, that is, in operation 230*c*, the message in operation 404 may be an Npcf_AM-PolicyControl_Update request message, and the message in operation 406 may be an Npcf_AMPolicyControl_Update response message. Alternatively, in the case where the AMF 120 acquires the DNN list and/or the S-NSSAI list from the PCF 140 during the process of UE policy association, that is, in operation 236*bc*, the message in operation 404 may be an Npcf_UEPolicyControl_Update request message and the message in operation 406 may be an Npcf_UEPolicyControl_Update response message.

In operation 407, the AMF 120 may perform SMF selection for establishment of a PDU session. The SMF selection may be performed through the NRF, similarly to operations 227*a*, 227*b*, and 227*c* of FIG. 3. For example, the AMF 120 may transmit, to the NRF 300, an Nnrf_NFDiscovery request message for discovering an SMF supporting DNN and/or S-NSSAI for a PDU session. If the selected DNN and/or the selected S-NSSAI is received from the PCF 140, the DNN and/or the S-NSSAI, requested by the AMF 120 to the NRF 300, may be the selected DNN and/or selected S-NSSAI, received from the PCF 140. Alternatively, if the selected DNN and/or selected S-NSSAI is not received from the PCF 140, the DNN and/or S-NSSAI requested by the AMF 120 to the NRF 300 may be the requested DNN and/or the requested S-NSSAI, received from the UE 100.

In operation 409, the AMF 120 may transmit an Nsmf_P-DUSession_CreateSMContext Request message to a selected SMF 135. The Nsmf_PDUSession_CreateSMContext Request may include at least one of the PDU session ID, the requested DNN, the requested S-NSSAI, the selected DNN, and the selected S-NSSAI.

In operation 412, the SMF 135 may perform a subscription retrieval/subscription for update procedure with the UDM 145.

In operation 415, the SMF 135 may transmit an Nsmf_P-DUSession_CreateSMContext response message to the AMF 120.

In operation 418, the UE 100 may perform a PDU session authentication/authorization procedure.

In operation 421, the AMF 120 may perform a PCF selection procedure for a PDU session. The PCF selection procedure may follow the procedure shown in FIG. 3. The PCF (hereinafter, referred to as SM PCF 400) selected for the PDU session may be the same as or different from the selected PCF (hereinafter, referred to as AM PCF 140) during the registration procedures illustrated in FIG. 2.

In operation 424, the AMF 120 may perform an SM policy association establishment procedure with the PCF 400.

In operation 427, the AMF 120 may perform a UPF selection procedure for the PDU session.

In operation 430, the AMF 120 may perform an SMF initiated SM policy association modification procedure with the PCF 400.

In operation 433, the SMF 135 may transmit an N4 session establishment request message to the UPF 130. In operation 436, the UPF 130 may transmit an N4 session establishment response message to the SMF 135.

In operation 439, the SMF 135 may transmit an N2 PDU session request message to the AMF 120. The N2 PDU session request message may include a PDU session establishment accept message, which is a NAS message to be transmitted by the AMF 120 to the UE 100. In operation 442, the AMF 120 may transmit an N2 PDU session response message to the SMF 135.

In operations 445 and 448, the AMF 120 may transmit a PDU session establishment accept message to the UE 100 through the base station 110. The PDU session establishment accept message may include at least one of the PDU session ID, the requested DNN, the requested S-NSSAI, the selected DNN, and the selected S-NSSAI. For example, if DNN replacement is not performed, the AMF 120 may include only the requested DNN in the PDU session establishment accept message. Alternatively, if DNN replacement has been performed and DNN replacement is to be performed without recognition of the UE 100, the AMF 120 may include only the requested DNN in the PDU session establishment accept message without the selected DNN. Alternatively, if DNN replacement has been performed and the DNN replacement is to be performed with recognition of the UE 100, the AMF 120 may include only the selected DNN in the PDU session establishment accept message without the requested DNN, or may include both the requested DNN and the selected DNN. If only the selected DNN is included in the PDU session establishment accept message, the UE 100 may identify that the requested DNN transmitted by the UE 100 in operation 403 is different from the selected DNN received in operation 448, and may determine that the selected DNN is used for the PDU session due to the occurrence of DNN replacement. Alternatively, in the case where the requested DNN and the selected DNN are included in the PDU session establishment accept message, the UE 100 may determine that the UE 100 has requested for the requested DNN, but the selected DNN is used for the PDU session. The UE 100, which has completed the PDU session establishment, may store PDU session related information (e.g., the PDU session ID, the requested DNN and/or selected DNN used for the PDU session, the requested S-NSSAI and/or selected S-NSSAI used for the PDU session, and the like).

In operation 454, the UE 100 having received the PDU session establishment accept message in operation 448 may start uplink data transmission.

In operation 457, the AMF 120 may transmit an Nsmf_PDUSession_UpdateSMContext Request message to the SMF 135.

In operation 460, the SMF 135 may transmit an N4 session modification request message to the UPF 130. In operation 463, the UPF 130 may transmit an N4 session modification response message to the SMF 135.

In operation 466, the SMF 135 may perform a registration procedure with the UDM 145.

In operation 469, the UPF 130 may start downlink data transmission to the UE 100.

In operation 472, the SMF 135 may transmit an Nsmf_PDUSession_UpdateSMContext Response message to the AMF 120.

In operation 475, the SMF 135 may perform an unsubscribe procedure with the UDM 145.

Figure 5:
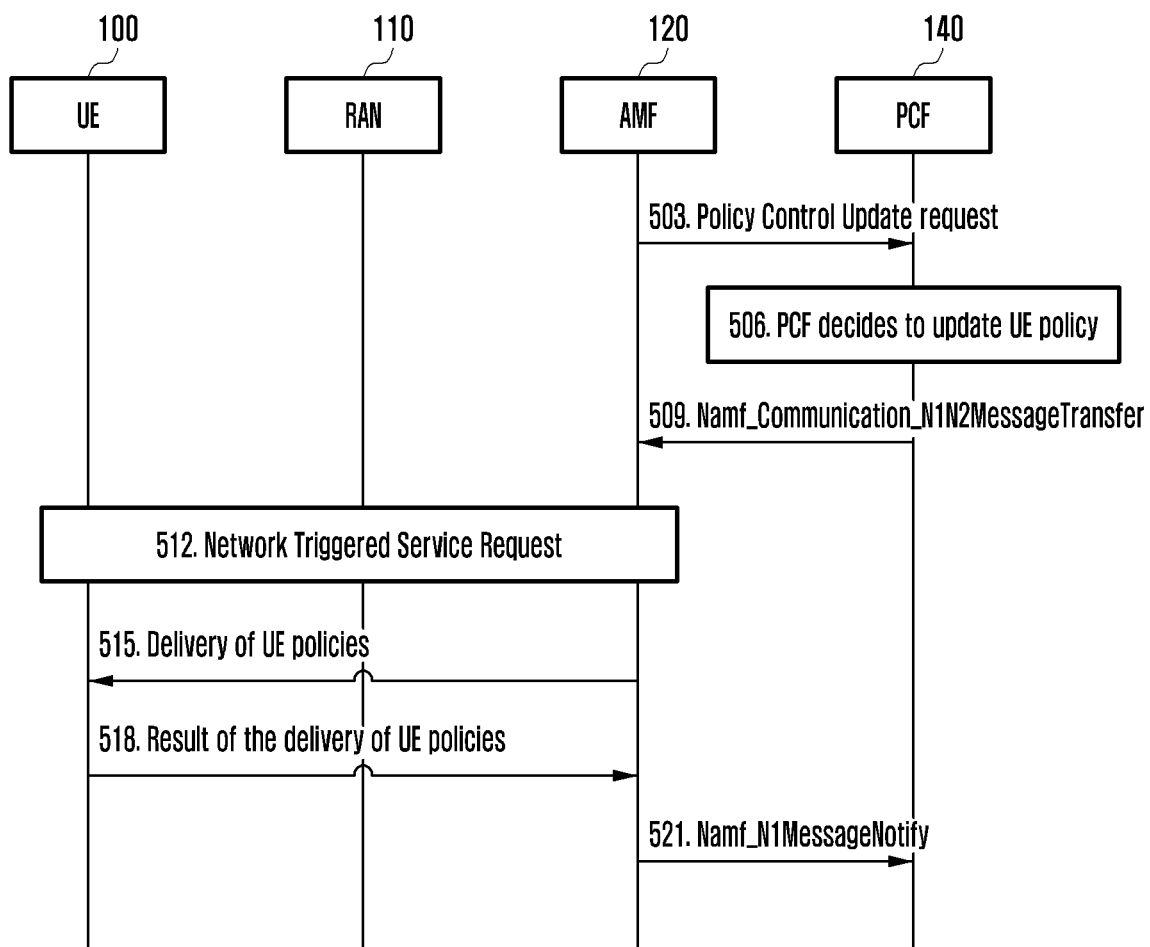
FIG. 5 illustrates a procedure for updating UE configuration information according to an embodiment of the disclosure.

FIG. 5 illustrates a procedure of updating UE configuration information according to an embodiment of the disclosure.

Referring to FIG. 5, in operation 503, the AMF 120 may transmit a policy information update request message to the PCF 140. The message in operation 503 may be the message in operation 230a of FIG. 3, the message in operation 236ba, and the message in operation 404 of FIG. 4.

In operation 506, the PCF 140 may determine to update UE policy information. For example, if there are many requests for DNN replacement or S-NSSAI replacement for the same DNN or the same S-NSSAI, the PCF 140 may determine to update the UE policy information.

In operation 509, the PCF 140 may transmit a Namf_Communication_N1N2MessageTransfer message to the AMF 120. The policy container included in the Namf_Communication_N1N2MessageTransfer message may include at least one of DNN information associated with an application (for example, identified by a combination of OSId and OSAppId), a DNN priority, equivalent DNN information that can be used in the same manner as the DNN, and the identifier of the UE 100 (e.g., SUPI, 5G-GUTI, and the like).

If the UE 100 is in an idle mode, in operation 512, the AMF 120 may perform a network triggered Service Request.

In operation 515, the AMF 120 may transmit a policy container received from the PCF 140 to the UE 100. The UE 100 may store and use information (e.g., UE route selection policy (URSP), and the like) included in the received policy container. According to an embodiment of the disclosure, the information of the policy container received by the UE 100 may include one or more DNNs. Alternatively, according to an embodiment of the disclosure, the information of the policy container received by the UE 100 may include one or more DNNs and a priority for each DNN. Alternatively, according to an embodiment of the disclosure, the information of the policy container received by the UE 100 may include one or more DNNs and a DNN (hereinafter, referred to as equivalent DNN) that can be used in the same manner as the DNNs.

The UE 100 according to an embodiment may establish a PDU session through the procedure shown in FIG. 4, and store PDU session related information (e.g., a PDU session ID, a requested DNN and/or the selected DNN used for a PDU session, and a requested S-NSSAI and/or a selected S-NSSAI used for the PDU session). In operation 515, the UE 100 having received the policy container may compare the PDU session-related information stored in the UE 100 and the information included in the received policy container, and various methods are possible as follows.

For example, in the case where one or more DNNs are included in the information of the policy container received by the UE 100, that is, the equivalent DNN is not included therein, and in the case where the PDU session related information, stored by the UE 100, includes one DNN (for example, the requested DNN or the selected DNN), the UE 100 may identify whether the DNN for the PDU session is included in the received policy container information, and if the DNN for the PDU session is not included in the information of the received policy container, the UE 100 may release the corresponding PDU session.

According to another example, in the case where one or more DNNs are included in the information of the policy container received by the UE 100, that is, the equivalent DNN is not included therein, and in the case where the PDU session related information, stored by the UE 100, includes two DNNs (for example, the requested DNN and the selected DNN), the UE 100 may identify whether the selected DNN for the PDU session is included in the received policy container information, and if the DNN for the PDU session is not included in the information of the received policy container, the UE 100 may release the corresponding PDU session.

According to still another example, in the case where one or more DNNs and equivalent DNNs that can be used in the same manner as the DNNs are included in the information of the policy container received by the UE 100, and one DNN (e.g., the requested DNN or selected DNN) is stored in the PDU session related information stored by the UE 100, the UE 100 identifies whether the DNN for the PDU session is included, as a DNN or equivalent DNN, in the received policy container information, and if the DNN for the PDU session is not included in the policy container information, the UE 100 may release the corresponding PDU session.

According to further another example, in the case where one or more DNNs and equivalent DNNs that can be used in the same manner as the DNNs are included in the information of the policy container received by the UE 100, and two DNNs (e.g., the requested DNN and the selected DNN) are stored in the PDU session related information stored by the UE 100, the UE 100 identifies whether the selected DNN for the PDU session is included, as a DNN or equivalent DNN, in the received policy container information, and if the selected DNN for the PDU session is not included in the policy container information, the UE 100 may release the corresponding PDU session.

According to still further another example, in the case where one or more DNNs and a priority for each DNN are included in the information of the policy container received by the UE 100, the UE 100 may identify whether the DNN for the PDU session is included, as a DNN, in the received policy container information. If the DNN for the PDU session is included in the policy container information, the UE 100 may maintain the PDU session. For example, the information of the policy container may include DNN #1, DNN #2, and DNN #3 as DNNs for the application, DNN #1 may be priority 1, DNN #2 may be priority 2, and DNN #3 may be priority 3. The PDU session for the application may be established with DNN #2. The UE may identify that DNN #2 for the PDU session is included as DNN #2 included in the policy container information, and may maintain the PDU session. Thereafter, in the case where a PDU session is required for an application using DNN #1, the UE 100 may reuse the PDU session already established with DNN #2 and transmit data traffic, instead of generating a new PDU session with DNN #1. Thereafter, the PDU session established with DNN #2 by the UE 100 may be released. If the PDU session is required for an application using DNN #1 after the PDU session established with DNN #2 is released, the UE may request generation of a new PDU session with DNN #1.

In operation 518, the UE 100 may transmit, to the AMF 120, a confirmation message indicating that the policy container information has been successfully received in operation 515. The UE 100 may use the latest policy information received in a subsequent PDU session establishment procedure.

In operation 521, the AMF 120 may transmit a Namf_N1MessageNotify message to the PCF 140.

Embodiment 3

Embodiment 3 describes a method for managing information of parameters transmitted by a UE and replaced parameters, by the UE and a network.

The UE 100 according to an embodiment may perform registration in the 5G system through the procedure illustrated in FIG. 2. In operation 203, the UE 100 may include network slice information (hereinafter, referred to as Requested NSSAI) to be used by the UE after registering the network slice information in the 5G system. The AMF 120, which has received the registration request message, may determine a registration area (RA) and allowed network slice information (hereinafter, Allowed NSSAI) that can be used by the UE after registering the same in the 5G system based on the received Requested NSSAI information, local configuration of the AMF, the UE subscription information, and information, such as the current network situation, after operation 203. In operation 236a, the AMF 120 may transmit the registration accept message including the Allowed NSSAI and the RA to the UE 100. The UE 100 may store the received Allowed NSSAI and RA, and then use the stored Allowed NSSAI and RA in the subsequent procedure.

The UE 100 according to an embodiment may establish a PDU session through the procedure illustrated in FIG. 4 after completing the registration in the 5G system. Prior to performing operation 403, the UE 100 may select an S-NSSAI associated with an application to be used by the UE 100, based on local configuration information stored in the UE 100. In addition, the UE may determine whether the selected S-NSSAI is included in the Allowed NSSAI, which is received in operation 236a and stored by the UE 100. If the selected S-NSSAI is included in the Allowed NSSAI, in operation 403, the UE 100 may include, in the PDU session establishment request transmitted to the AMF 120, the selected S-NSSAI (hereinafter, referred to as requested S-NSSAI) and the PDU session ID assigned by the UE itself.

Upon receiving the PDU session establishment request, the AMF 120 may determine to perform S-NSSAI replacement. In operation 404, the AMF 120 may determine the selected S-NSSAI to replace the requested S-NSSAI, requested by the UE through operation 406. The AMF 120 may store the PDU session ID, the requested S-NSSAI, and the selected S-NSSAI as the UE context of the UE 100.

In operations 445 and 448, the AMF 120 may transmit a PDU session establishment accept message to the UE 100 through the base station 110. The PDU session establishment accept may include at least one of the PDU session ID, the requested S-NSSAI, and the selected S-NSSAI. For example, if S-NSSAI replacement is not performed, the AMF 120 may include only the requested S-NSSAI in the PDU session establishment accept message. Alternatively, if S-NSSAI replacement has been performed and the S-NSSAI replacement is to be performed without recognition of the UE 100, the AMF 120 may include only the requested S-NSSAI in the PDU session establishment accept message without the selected S-NSSAI. Alternatively, if the S-NSSAI replacement has been performed and the S-NSSAI replacement is to be performed with recognition of the UE 100, the AMF 120 may include only the selected S-NSSAI in the PDU session establishment accept message without the requested S-NSSAI, or may include both the requested S-NSSAI and the selected S-NSSAI. If only the selected S-NSSAI is included in the PDU session establishment accept message, the UE 100 may identify that the requested S-NSSAI transmitted by the UE 100 in operation 403 is different from the selected S-NSSAI received in operation 448, and may determine that the selected S-NSSAI is used for the PDU session due to the occurrence of S-NSSAI replacement. Alternatively, in the case where the requested S-NSSAI and the selected S-NSSAI are included in the PDU session establishment accept message, the UE 100 may request the requested S-NSSAI, but may determine that the selected S-NSSAI is used for the PDU session. The UE 100, which has completed the PDU session establishment, may store PDU session related information (e.g., the PDU session ID, the requested S-NSSAI and/or the selected S-NSSAI used for the PDU session, and the like).

The UE 100 according to an embodiment may support the mobility, uses a PDU session after establishing a PDU session, and leave the RA area received by the UE 100 from the AMF 200. The UE having left the RA area may perform mobility registration in the 5G system through the procedure illustrated in FIG. 2. In operation 203, the UE 100 may transmit a registration request message for mobility registration to the AMF 120. The registration request message may include the network slice information (hereinafter, referred to as Requested NSSAI) to be used by the UE 100 after registering mobility in the 5G system and/or PDU session information (e.g., the PDU session ID) to be continuously executed by the UE 100. At this time, the UE 100 may include, in the Requested NSSAI, an S-NSSAI (e.g., the requested S-NSSAI and/or the selected S-NSSAI) related to the PDU session being used by the UE 100.

In operation 209, the AMF 120 may discover an AMF previously serving the UE 100, that is, the old AMF 200, based on the received identifier of the UE 100 (e.g., SUPI or 5G-GUTI). In operation 212, the AMF 120 may transmit a Namf_Communication_UEContextTransfer message requesting the UE context to the old AMF 200. The Namf_Communication_UEContextTransfer message may include the identifier of the UE 100 (e.g., SUPI or 5G-GUTI). The old AMF 200 identifies whether the UE context of the corresponding UE 100 is stored, and if the UE context exists, the old AMF 200 may include the UE context of the UE 100 in the Namf_Communication_UEContextTransfer response message transmitted in operation 215. The UE context may include at least one of a PDU session ID being used by the UE 100, and a requested DNN, a selected DNN, a requested S-NSSAI, and a selected S-NSSAI, which are associated with the PDU session ID. The AMF 120 having received the Namf_Communication_UEContextTransfer response message may store the received UE context information.

Alternatively, in operation 224d, the AMF 120 may acquire, from the UDM 145, the UE 100 related information (e.g., access and mobility subscription data, SMF selection subscription data, UE context, subscribed DNNs, subscribed S-NSSAIs, and the like). The UE 100 related information may include PDU session information of the UE 100. For example, the PDU session information may include at least one of a PDU session ID being used by the UE 100, and a requested DNN, a selected DNN, a requested S-NSSAI, and a selected S-NSSAI, which are associated with the PDU session ID. The AMF 120 may store the UE 100 related information received from the UDM 145.

Alternatively, in operation 230, the AMF 120 may acquire, from the PCF 140, the UE 100 related information (e.g., access and mobility subscription data, SMF selection subscription data, UE context, subscribed DNNs, subscribed S-NSSAIs, and the like). The UE 100 related information may include PDU session information of the UE 100. For example, the PDU session information may include at least one of a PDU session ID being used by the UE 100, and a requested DNN, a selected DNN, a requested S-NSSAI, and a selected S-NSSAI, which are associated with the PDU session ID. The AMF 120 may store the UE 100 related information received from the PCF 140.

The AMF 120, which has received the registration request message, may determine a registration area (RA) and allowed network slice information (hereinafter, Allowed NSSAI) that can be used by the UE after registering the same in the 5G system based on the received Requested NSSAI information, the AMF local configuration, the UE subscription information, and information, such as the current network situation, after operation 203. Further, in determining the Allowed NSSAI, the AMF 120 may consider UE context information received from the old AMF 200 in operation 215, UE information received from the UDM 145 in operation 225d, and UE information received from the PCF 140 in operation 230. For example, the AMF 120 may include, in the Allowed NSSAI, the selected S-NSSAI included in the UE context or UE information.

In operation 233, the AMF 120 may manage a PDU session to be continuously executed by the UE 100. The AMF 120 may acquire the S-NSSAI (e.g., the requested S-NSSAI and/or the selected S-NSSAI) information associated with the PDU session being used by the UE 100, from UE context information received from the old AMF 200 in operation 215, UE information received from the UDM 145 in operation 225d, or UE information received from PCF 140 in operation 230, and may manage the PDU session based on S-NSSAI information associated with the PDU session. Further, the AMF 120 may use Allowed NSSAI information determined by the AMF 120 at the time of managing the PDU session.

For example, AMF 120 may identify whether the selected S-NSSAI of the PDU session is included in the Allowed NSSAI. If the selected S-NSSAI is not included in the Allowed NSSAI, the AMF 120 may release the corresponding PDU session. Alternatively, even if the selected S-NSSAI is not included in the Allowed NSSAI, if the requested S-NSSAI is included in the Allowed NSSAI, the AMF 120 may continue to maintain the corresponding PDU session without releasing the same.

According to another example, the AMF 120 may identify whether the requested S-NSSAI of the PDU session is included in the Allowed NSSAI. If the requested S-NSSAI is not included in the Allowed NSSAI, the AMF 120 may release the corresponding PDU session.

In operation 236a, the AMF may transmit the registration accept message including the Allowed NSSAI and RA to the UE 100. The UE 100 may store the received Allowed NSSAI and RA and use the stored Allowed NSSAI and RA in the subsequent procedure.

If S-NSSAI replacement occurs, the AMF 120 according to an embodiment may store, as the UE context, S-NSSAI (requested S-NSSAI) requested by the UE as well as S-NSSAI (selected S-NSSAI) associated with a PDU session, and thus may maintain the session of the UE in the case where the UE mobility registration occurs.

Figure 6:
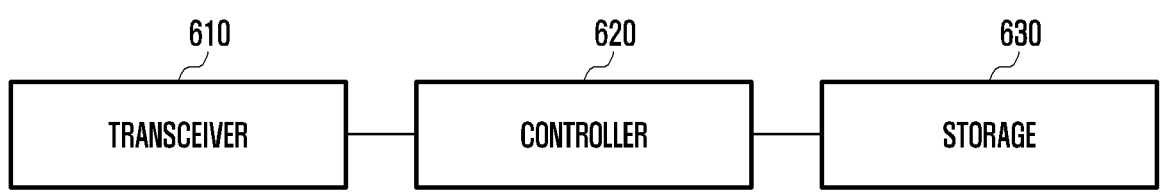
FIG. 6 illustrates a structure of a UE according to an embodiment of the disclosure.

FIG. 6 illustrates a structure of a UE according to an embodiment of the disclosure.

Referring to FIG. 6, the UE may include a transceiver 610, a controller 620, and a storage 630. In the disclosure, the controller may be defined as a circuit, an application-specific integrated circuit, or at least one processor.

The transceiver 610 may transmit or receive signals to or from another network entity. The transceiver 610 may receive system information from a base station, for example, and may receive a synchronization signal or a reference signal.

The controller 620 may control the overall operations of the UE according to an embodiment proposed in the disclosure. For example, the controller 620 may control a signal flow between blocks so as to perform operations according to the procedures described above with reference to FIGS. 1A to 5. For example, the controller 620 may control operations proposed by the disclosure in order to replace DNN and/or S-NSSAI in a wireless communication system according to an embodiment.

The storage 630 may store at least one of information transmitted or received through the transceiver 610 and information generated through the controller 620. For example, the storage 630 may store information (e.g., DNN-related information, S-NSSAI-related information, UE configuration information, and the like) used in the procedures related to DNN and/or S-NSSAI replacement according to the embodiment described above.

Figure 7:
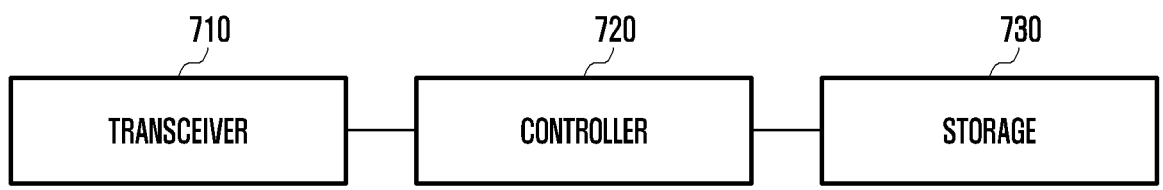
FIG. 7 illustrates a structure of a base station according to an embodiment of the disclosure.

FIG. 7 illustrates a structure of a base station according to an embodiment of the disclosure.

Referring to FIG. 7, the base station may include a transceiver 710, a controller 720, and a storage 730. In the disclosure, the controller may be defined as a circuit, an application-specific integrated circuit, or at least one processor.

The transceiver 710 may transmit or receive signals to or from another network entity. The transceiver 710 may transmit system information to the UE, for example, and may transmit a synchronization signal or a reference signal.

The controller 720 may control the overall operations of the base station according to the embodiment proposed in the disclosure. For example, the controller 720 may control a signal flow between blocks in order to perform operations according to the procedures described above with reference to FIGS. 1A to 5. Specifically, the controller 720 may control the operation proposed by the disclosure in order to replace DNN and/or S-NSSAI in a wireless communication system according to the embodiment.

The storage 730 may store at least one of information transmitted or received through the transceiver 710 and information generated through the controller 720. For example, the storage 730 may store information (e.g., DNN-related information, S-NSSAI-related information, and the like) used in procedures related to DNN and/or S-NSSAI replacement according to the embodiment described above.

Figure 8:
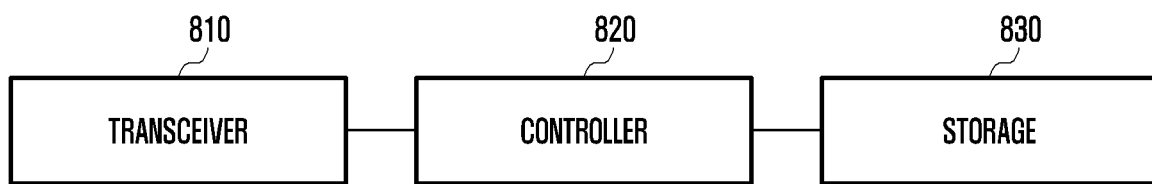
FIG. 8 illustrates a structure of an access and mobility management function (AMF) according to an embodiment of the disclosure.

FIG. 8 illustrates a structure of an AMF according to an embodiment of the disclosure.

Referring to FIG. 8, the AMF may include a transceiver 810, a controller 820, and a storage 830. In the disclosure, the controller may be defined as a circuit, an application-specific integrated circuit, or at least one processor.

The transceiver 810 may transmit or receive signals to or from another network entity. The transceiver 810 may receive, for example, system information from a base station, and may receive a synchronization signal or a reference signal.

The controller 820 may control the overall operations of the AMF according to the embodiment proposed in the disclosure. For example, the controller 820 may control a signal flow between blocks so as to perform operations according to the procedures described above with reference to FIGS. 1A to 5. For example, the controller 820 may control an operation proposed by the disclosure in order to replace DNN and/or S-NSSAI in a wireless communication system according to an embodiment.

The storage 830 may store at least one of information transmitted or received through the transceiver 810 and information generated through the controller 820. For example, the storage 630 may store information (e.g., DNN-related information, S-NSSAI-related information, and the like) used in procedures related to DNN and/or S-NSSAI replacement according to the above-described embodiment.

Figure 9:
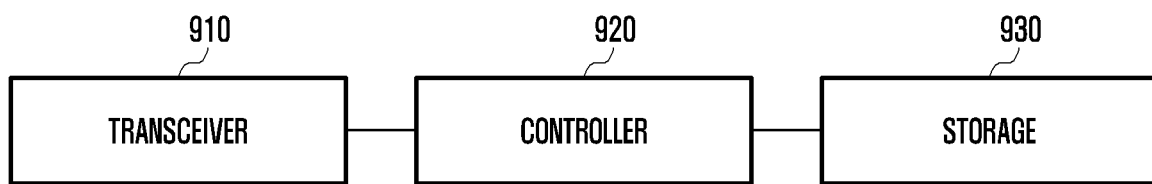
FIG. 9 illustrates a structure of a PCF according to an embodiment of the disclosure.

FIG. 9 illustrates a structure of a PCF according to an embodiment of the disclosure.

Referring to FIG. 9, the PCF may include a transceiver 910, a controller 920, and a storage 930. In the disclosure, the controller may be defined as a circuit, an application-specific integrated circuit, or at least one processor.

The transceiver 910 may transmit or receive signals to or from another network entity. The transceiver 910 may transmit system information to the base station, for example, and may transmit a synchronization signal or a reference signal.

The controller 920 may control the overall operations of the PCF according to the embodiment proposed in the disclosure. For example, the controller 920 may control a signal flow between blocks so as to perform operations according to the procedures described above with reference to FIGS. 1A to 5. Specifically, the controller 920 may control the operation proposed by the disclosure in order to replace DNN and/or S-NSSAI in a wireless communication system according to an embodiment.

The storage 930 may store at least one of information transmitted or received through the transceiver 910 and information generated through the controller 920. For example, the storage 930 may store information (e.g., DNN-related information, S-NSSAI-related information, and the like) used in procedures related to DNN and/or S-NSSAI replacement according to the embodiment described above.

Figure 10:
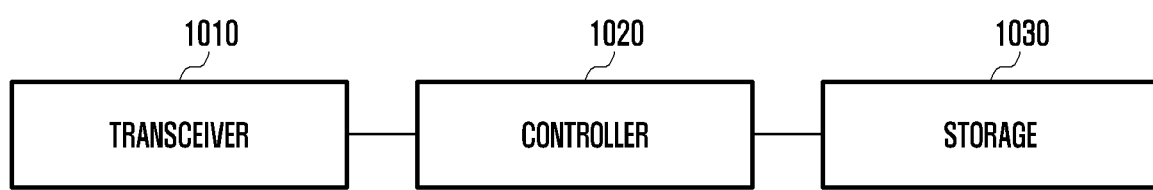
FIG. 10 illustrates a structure of a Network Repository Function (NRF) or a service communication proxy (SCP) according to an embodiment of the disclosure.

FIG. 10 illustrates a structure of an NRF or SCP according to an embodiment of the disclosure.

Referring to FIG. 10, the NRF or SCP may include a transceiver 1010, a controller 1020, and a storage 1030. In the disclosure, the controller may be defined as a circuit, an application-specific integrated circuit, or at least one processor.

The transceiver 1010 may transmit or receive signals to or from another network entity. The transceiver 1010 may transmit system information to the base station, for example, and may transmit a synchronization signal or a reference signal.

The controller 1020 may control the overall operations of the NRF or SCP according to the embodiment proposed in the disclosure. For example, the controller 1020 may control a signal flow between each block so as to perform operations according to the procedures described above with reference to FIGS. 1A to 5. Specifically, the controller 1020 may control the operation proposed by the disclosure in order to replace DNN and/or S-NSSAI in a wireless communication system according to an embodiment.

The storage 1030 may store at least one of information transmitted or received through the transceiver 1010 and information generated through the controller 1020. For example, the storage 1030 may store information (e.g., DNN-related information, S-NSSAI-related information, and the like) used in procedures related to DNN and/or S-NSSAI replacement according to the embodiment described above.

Although not explicitly shown in the disclosure, the network entities shown in FIGS. 1A to 5 (e.g., SMF, UDM, UPF, data network (DN), and the like) may have the same or similar structures to those shown in FIGS. 6 to 10. For example, SMF, UDM, UPF, DN, and the like, may include a transceiver, a controller, and/or a storage.

In this case, the transceiver may transmit or receive signals to or from another network entity. The transceiver may transmit system information to the base station, for example, and may transmit a synchronization signal or a reference signal.

The controller may control the overall operations of the corresponding network entity according to the embodiment proposed in the disclosure. For example, the controller may control a signal flow between each block so as to perform an operation according to the procedures described above with reference to FIGS. 1A to 5. Specifically, the controller may control the operation proposed in the disclosure in order to replace DNN and/or S-NSSAI in a wireless communication system according to the embodiment.

The storage may store at least one of information transmitted or received through the transceiver and information generated through the controller. For example, the storage may store information (e.g., DNN-related information, S-NSSAI-related information, and the like) used in procedures related to DNN and/or S-NSSAI replacement according to the embodiment described above.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an access and mobility management function (AMF) in a mobile communication system, the method comprising:
   receiving, from a user equipment (UE), a message for a protocol data unit (PDU) session establishment request, the message including information on a UE requested data network name (DNN); and
   based on operator policy information received from a policy control function (PCF), determining whether to reject the message for the PDU session establishment request or to request the PCF to replace the UE requested DNN,
   wherein the operator policy information includes first information on a list of at least one single network slice selection assistance information (S-NSSAI) and second information on a list of at least one DNN per S-NSSAI.

2. The method of claim 1, wherein the determining of whether to reject the message for the PDU session establishment request or to request the PCF to replace the UE requested DNN comprises:
   in case that the UE requested DNN is indicated for replacement in the operator policy information, requesting the PCF to perform a DNN replacement.

3. The method of claim 1, wherein the determining of whether to reject the message for the PDU session establishment request or to request the PCF to replace the UE requested DNN comprises:
   in case that the UE requested DNN is not supported by a network and not indicated for replacement in the operator policy information, rejecting the message for the PDU session establishment request with a cause value.

4. The method of claim 2, wherein the requesting of the PCF to perform the DNN replacement comprises:
   transmitting, to the PCF, a message to request the DNN replacement; and
   receiving, from the PCF, a DNN selected by the PCF.

5. The method of claim 4, wherein the UE requested DNN is replaced by the selected DNN.

6. A method performed by a policy control function (PCF) in a mobile communication system, the method comprising:
   transmitting, to an access and mobility management function (AMF), operator policy information, the operator policy information including first information on a list of at least one single network slice selection assistance information (S-NSSAI) and second information on a list of at least one data network name (DNN) per S-NSSAI,
   wherein the operator policy information is used to determine whether to reject a message from a user equipment (UE) for a protocol data unit (PDU) session establishment request including a UE requested DNN or to request the PCF to replace the UE requested DNN.

7. The method of claim 6, wherein in case that the UE requested DNN is indicated for replacement in the operator policy information, a DNN replacement is requested to the PCF.

8. The method of claim 6, wherein in case that the UE requested DNN is not supported by a network and not indicated for replacement in the operator policy information, the message for the PDU session establishment request is rejected with a cause value.

9. The method of claim 7, further comprising:
   receiving, from the AMF, a message to request the DNN replacement;
   selecting a DNN for the DNN replacement; and
   transmitting, to the AMF, the selected DNN.

10. The method of claim 9, wherein the UE requested DNN is replaced by the selected DNN.

11. An access and mobility management function (AMF) in a mobile communication system, the AMF comprising:
    a transceiver; and
    a controller configured to:
        receive, from a user equipment (UE) via the transceiver, a message for a protocol data unit (PDU) session establishment request, the message including information on a UE requested data network name (DNN), and
        based on operator policy information received from a policy control function (PCF), determine whether to reject the message for the PDU session establishment request or to request the PCF to replace the UE requested DNN,
    wherein the operator policy information includes first information on a list of at least one single network slice selection assistance information (S-NSSAI) and second information on a list of at least one DNN per S-NSSAI.

12. The AMF of claim 11, wherein the controller is further configured to:
    in case that the UE requested DNN is indicated for replacement in the operator policy information, request the PCF to perform a DNN replacement.

13. The AMF of claim 11, wherein the controller is further configured to:
    in case that the UE requested DNN is not supported by a network and not indicated for replacement in the operator policy information, reject the message for the PDU session establishment request with a cause value.

14. The AMF of claim 12, wherein the controller is further configured to:
    transmit, to the PCF via the transceiver, a message to request the DNN replacement, and
    receive, from the PCF via the transceiver, a DNN selected by the PCF.

15. The AMF of claim 14, wherein the UE requested DNN is replaced by the selected DNN.

16. A policy control function (PCF) in a mobile communication system, the PCF comprising:
    a transceiver; and
    a controller configured to:
        transmit, to an access and mobility management function (AMF) via the transceiver, operator policy information, the operator policy information including first information on a list of at least one single network slice selection assistance information (S-NSSAI) and second information on a list of at least one data network name (DNN) per S-NSSAI,
    wherein the operator policy information is used to determine whether to reject a message from a user equipment (UE) for a protocol data unit (PDU) session establishment request including a UE requested DNN or to request the PCF to replace the UE requested DNN.

17. The PCF of claim 16, wherein, in case that the UE requested DNN is indicated for replacement in the operator policy information, a DNN replacement is requested to the PCF.

18. The PCF of claim 16, wherein in case that the UE requested DNN is not supported by a network and not indicated for replacement in the operator policy information, the message for the PDU session establishment request is rejected with a cause value.

19. The PCF of claim 17, wherein the controller is further configured to:
- receive, from the AMF via the transceiver, a message to request the DNN replacement,
- select a DNN for the DNN replacement, and
- transmit, to the AMF via the transceiver, the selected DNN.

20. The PCF of claim 19, wherein the UE requested DNN is replaced by the selected DNN.

* * * * *